US010528918B1

(12) United States Patent
Cherubini

(10) Patent No.: US 10,528,918 B1
(45) Date of Patent: Jan. 7, 2020

(54) COMMUNICATION DISTRIBUTION BASED ON CALENDAR INFORMATION

(71) Applicant: GOOGLE LLC, Mountain View, CA (US)

(72) Inventor: Mauro Cherubini, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 143 days.

(21) Appl. No.: 13/892,502

(22) Filed: May 13, 2013

(51) Int. Cl.
*G06Q 10/10* (2012.01)
*G06Q 10/06* (2012.01)

(52) U.S. Cl.
CPC ..... *G06Q 10/1093* (2013.01); *G06Q 10/0631* (2013.01)

(58) Field of Classification Search
CPC ................................ G06Q 10/00; G06Q 30/02
USPC ................................................. 705/7.11–7.42
See application file for complete search history.

(56) References Cited

U.S. PATENT DOCUMENTS

| | | | |
|---|---|---|---|
| 6,016,478 A | 1/2000 | Zhang et al. | |
| 6,094,681 A | 7/2000 | Shaffer et al. | |
| 6,519,629 B2 | 2/2003 | Harvey et al. | |
| 6,574,630 B1 * | 6/2003 | Augustine et al. | |
| 6,965,917 B1 | 11/2005 | Aloni et al. | |
| 7,082,402 B2 | 7/2006 | Conmy et al. | |
| 7,487,211 B2 | 2/2009 | Beavers et al. | |
| 8,005,203 B2 | 8/2011 | Archambault et al. | |
| 8,095,665 B1 | 1/2012 | Bau | |
| 8,368,738 B2 | 2/2013 | Schindler | |
| 8,400,489 B2 | 3/2013 | Le Goff et al. | |
| 8,477,176 B1 | 7/2013 | Cortes et al. | |
| 8,699,686 B2 | 4/2014 | Goguen et al. | |
| 8,754,926 B1 | 6/2014 | Gossweiler et al. | |
| 2002/0076025 A1 | 6/2002 | Liversidge et al. | |
| 2003/0154116 A1 | 8/2003 | Lofton | |
| 2004/0073615 A1 * | 4/2004 | Darling | 709/206 |

(Continued)

FOREIGN PATENT DOCUMENTS

EP 2224683 A1 1/2010

OTHER PUBLICATIONS

Mann, Bill. "How to Do Everything with Microsoft Office Outlook 2003," McGraw-Hill/Osborne, 2003, pp. 172-187, 192-195, 205-208, 404-408.

(Continued)

*Primary Examiner* — Robert D Rines
(74) *Attorney, Agent, or Firm* — Brake Hughes Bellermann LLP

(57) ABSTRACT

A method and apparatus for performing communication distribution based on calendar information is provided. Communication distribution based on calendar information may include receiving a scheduling request for an account associated with a calendar, the scheduling request indicating event information corresponding to an event, storing a calendar entry in the calendar, the calendar entry including the event information, receiving an event notification indicating the event, identifying the account associated with the calendar based on the event notification and the stored event information, generating a message indicating the event, and sending the message to the account on a condition that the account is associated with a permission indicator indicating a permission to receive messages associated with the event.

20 Claims, 4 Drawing Sheets

(56) References Cited

U.S. PATENT DOCUMENTS

| | | | |
|---|---|---|---|
| 2004/0078436 A1* | 4/2004 | Demsky et al. | 709/206 |
| 2004/0199412 A1 | 10/2004 | McCauley | |
| 2005/0033615 A1 | 2/2005 | Nguyen et al. | |
| 2005/0044503 A1 | 2/2005 | Richardson et al. | |
| 2005/0216842 A1 | 9/2005 | Keohane et al. | |
| 2006/0184885 A1 | 8/2006 | Hayes, Jr. et al. | |
| 2006/0190485 A1 | 8/2006 | Adams et al. | |
| 2006/0190547 A1 | 8/2006 | Bhogal et al. | |
| 2006/0224969 A1 | 10/2006 | Marston | |
| 2007/0073810 A1 | 3/2007 | Adams et al. | |
| 2007/0198316 A1 | 8/2007 | Boland et al. | |
| 2008/0033957 A1* | 2/2008 | Forstall | G06Q 10/109 |
| 2008/0046311 A1 | 2/2008 | Shahine et al. | |
| 2011/0054976 A1* | 3/2011 | Adler | G06Q 10/109 705/7.18 |
| 2011/0231240 A1 | 9/2011 | Schoen et al. | |
| 2012/0150581 A1* | 6/2012 | McPhail | G06Q 10/10 705/7.19 |
| 2013/0282421 A1* | 10/2013 | Graff et al. | 705/7.18 |
| 2014/0310044 A1* | 10/2014 | Meltzer | G06Q 10/1095 705/7.19 |

OTHER PUBLICATIONS

Nyamgondalu, Nagendra, "Lotus Notes Calendar and Scheduling explained" IBM developerWorks. Oct. 2004 Web. Dec. 9, 2004, http://web.archive.org/web/20041209233627/www-106.ibm.com/developerworks/- lotus/library/cs-pt1.

* cited by examiner

COMMUNICATION DISTRIBUTION BASED ON CALENDAR INFORMATION

TECHNICAL FIELD

This application relates to identifying accounts for communication based on event information included in associated calendars.

BACKGROUND

An account in an electronic communication system may interact with various productivity tools, such as an e-mail system and an electronic scheduling system or calendar. A user associated with an account may use a calendar to schedule an appointment or reminder associated with an event. Accordingly, a method for identifying accounts for event related communication based on calendar entries would be advantageous.

SUMMARY

Disclosed herein are aspects of systems, methods, and apparatuses for automated collaboration.

An aspect is a method for communication distribution based on calendar information. Communication distribution based on calendar information may include receiving a scheduling request for an account associated with a calendar, the scheduling request indicating event information corresponding to an event, the event information including an event identifier, a name of the event, a date of the event, or a location of the event, storing a calendar entry in the calendar, the calendar entry including the event information, receiving an event notification indicating the event, identifying, by a processor, the account associated with the calendar based on the event notification and the stored event information, generating a message indicating the event, and sending the message to the account on a condition that the account is associated with a permission indicator indicating a permission to receive messages associated with the event.

An aspect is a method for communication distribution based on calendar information. Communication distribution based on calendar information may include receiving an event notification indicating an event, identifying, by a processor, an account associated with a calendar based on the event notification and event information stored in a calendar entry in the calendar, wherein the event information includes an event identifier, a name of the event, a date of the event, or a location of the event, and sending a message indicating the event to the account on a condition that the account is associated with a permission indicator indicating a permission to receive messages associated with the event.

An aspect is a method for communication distribution based on calendar information. Communication distribution based on calendar information may include receiving, from a first plurality of remote devices, a plurality of scheduling requests, each scheduling request in the plurality of scheduling requests associated with a respective account, in a plurality of accounts, each account in the plurality of accounts associated with a respective calendar in a plurality of calendars, each scheduling request in the plurality of scheduling requests indicating respective event information corresponding to an event, the event information including an event identifier, and for each scheduling request in the plurality of scheduling requests, storing a respective calendar entry in the respective calendar, the calendar entry including the respective event information. Communication distribution based on calendar information may include receiving, from a second remote device, an event notification indicating the event identifier, identifying, by a processor, the plurality of accounts associated based on the event notification and the calendar entries, generating a message indicating the event, and for each account in the plurality of accounts, on a condition that the account is associated with a respective permission indicator indicating a permission to receive messages associated with the event, sending the message to the account.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

People and organizations may publish information online regarding various events. User access to and interaction with the event information may be monitored; however, it may be difficult identify and communicate with users that are interested in the event but have not provided explicit contact information.

Users that access the event information and do not confirm interest in the event may be shown an advertising message; however, many such users may not be interested in the event and some interested users may not respond to the advertising message, for example, due to inattentional blindness, or the message may be blocked by, for example, advertisement blocking software. Users that are interested in the event may be identified based on information provided in, for example, social media sites; however, identifying users based on social media may require access to the social media and may require use of, for example, cookies, which may be blocked.

Networked productivity applications, such as calendaring applications, may allow for the creation and management of scheduling information associated with a user or account. For example, a user may create an event including information corresponding to an event. Accordingly, communication distribution based on calendar information may be performed to identify and communicate with users that are interested in an event based on calendar information. Advertisement and cookie blocking software may not block communication distribution based on calendar information.

Figure 1:
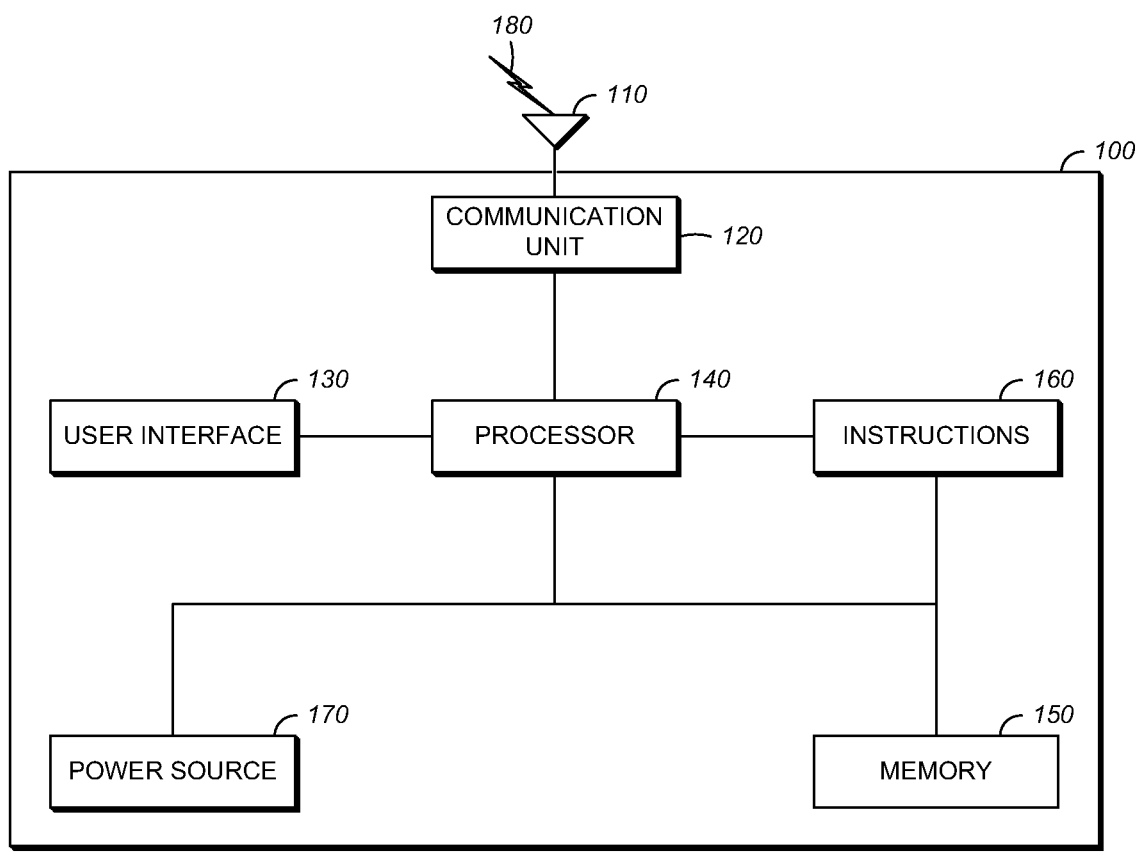
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
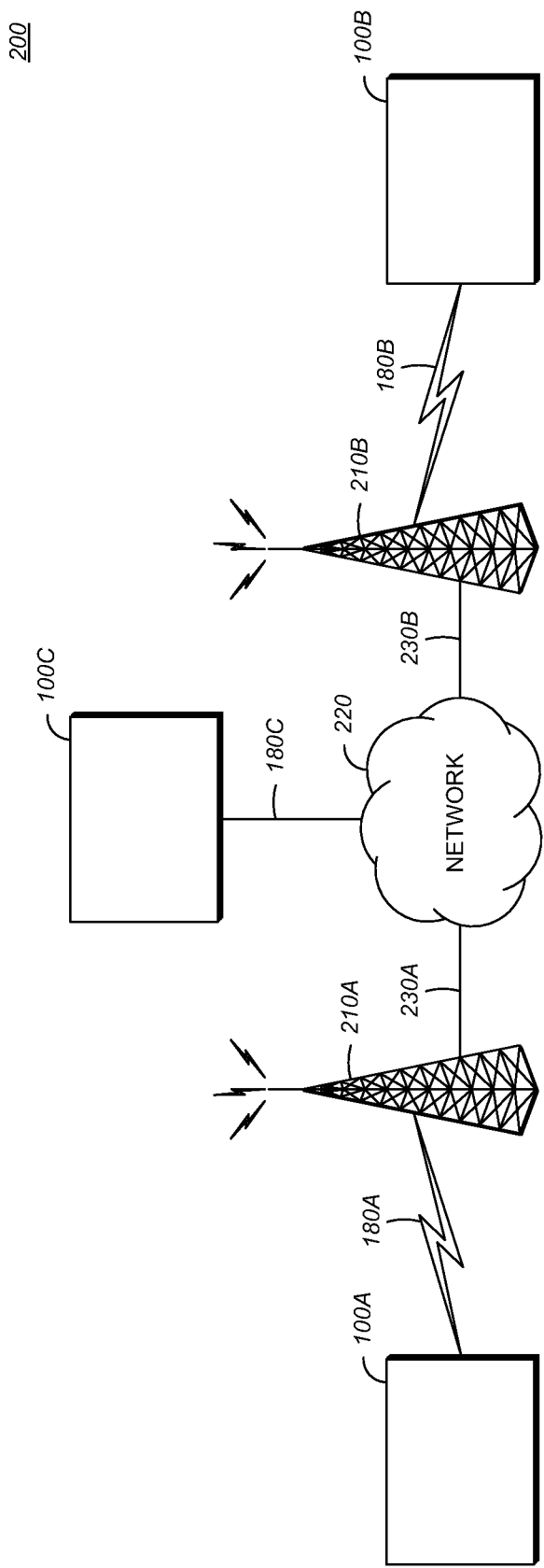
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
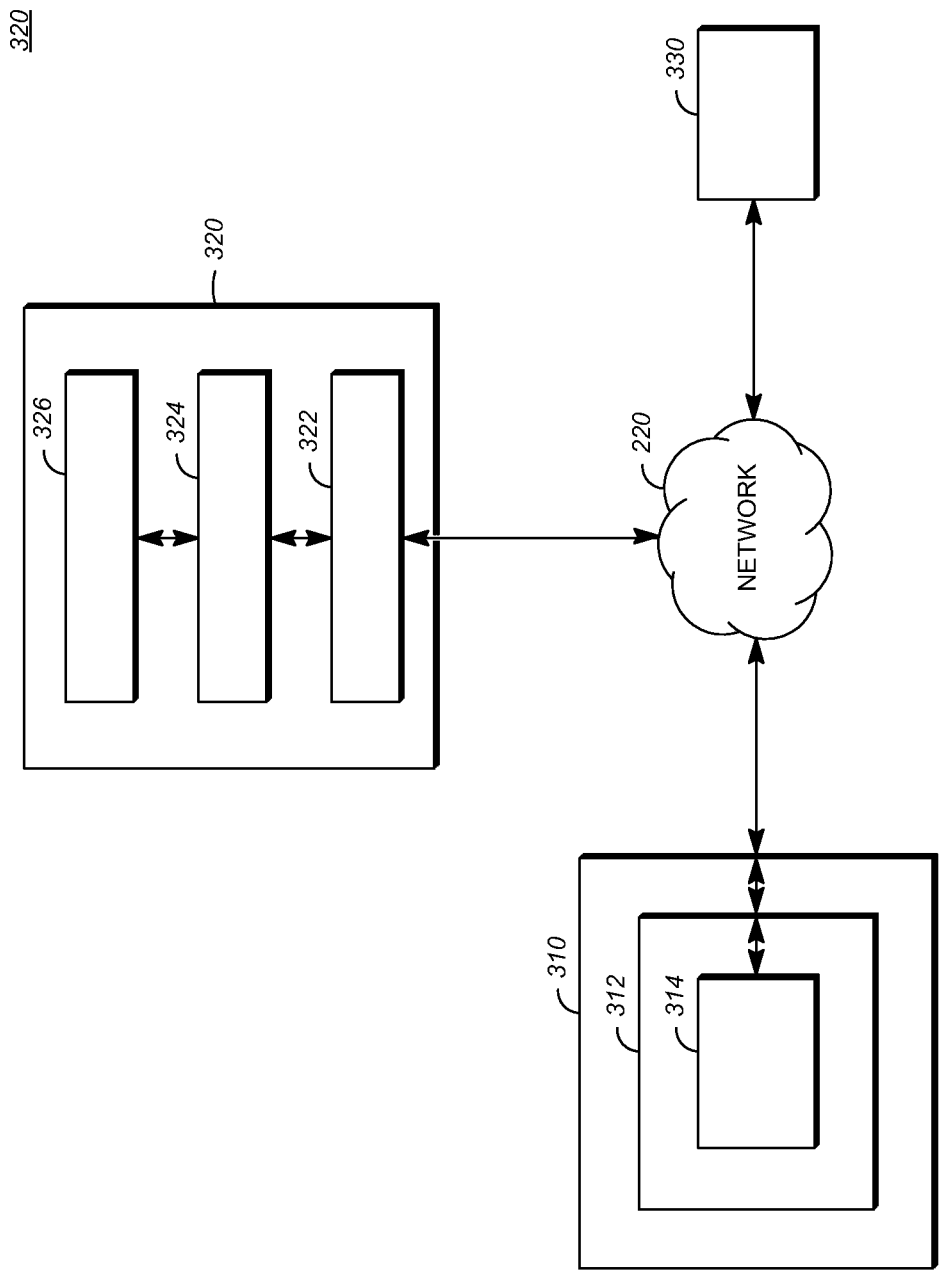
FIG. 3 is a diagram of a communication system for a networked application in accordance with implementations of this disclosure.

FIG. 3 is a diagram of a communication system for a networked application 300 in accordance with implementations of this disclosure. Executing the networked application 300 may include a user device 310, which may be a computing device, such as the computing device 100 shown in FIG. 1 or the computing and communication devices 100A/100B shown in FIG. 2, communicating with a server 320, which may be a computing device, such as the computing device 100 shown in FIG. 1 or computing and communication device 100C shown in FIG. 2, via a network 330, such as the network 220 shown in FIG. 2.

In some implementations, the server 320 may execute a portion or portions of the networked application 300, which may include, for example, generating, modifying, and storing documents and information related to the documents, such as metadata, and providing information for displaying and interacting with the networked application 300 to the user device 310. In some implementations, the server 320 may include one or more logical units 322/324/326. For example, the server 320 may include a web server 322 for receiving and processing requests, such as HTTP requests, from user devices; an application server 324 for executing applications, such as a spreadsheet application or a word processing application; and a database 326 for storing and managing data, such as documents or information about documents, such as metadata. In some implementations, the server 320 may provide information for the networked application 300 to the user device 310 using one or more protocols, such as HyperText Markup Language (HTML), Cascading Style Sheets (CSS), Extensible Markup Language (XML), or JavaScript Object Notation (JSON).

The user device 310 may execute a portion or portions of the networked application 300. For example, the user device 310 may execute a local application 312, such as a browser application, which may receive information from the server 320 and may present a representation of an interface 314 for displaying the networked application 300 and user interactions therewith. For example, the user device 310, may execute a browser application, the browser application may send a request, such as an HTTP request, for the networked application 300 to the server 320, the browser may receive information for presenting the networked application 300, such as HTML and XML data, and the browser may present an interface for the networked application 300. The user device 310 may execute portions of the networked application 300, which may include executable instructions, such as JavaScript, received from the server 320. The user device 310 may receive user input for the networked application 300, may update the interface 314 for the networked application 300 in response to the user input, and may send information for the networked application 300, such as information indicating the user input, to the server 320.

In some implementations, a portion or portions of the networked application may be cached at the user device 310. For example, the user device 310 may execute a portion or portions of the networked application 300 using information previously received from the server 320 and stored on the user device 310. Although the user device 310 and the server 320 are shown separately, they may be combined. For example, a physical device, such as the computing device 100 shown in FIG. 1 may execute the user device 310 as a first logical device and may execute the server 320 as a second logical device.

In some implementations, the networked application 300 may generate files, folders, or documents, such as spreadsheets or word processing documents. The files, folders, or documents, may be created and stored on the user device 310, the server 320, or both. For example, a document may be created and stored on the server 320 and a copy of the document may be transmitted to the user device 310. Modifications to the document may be made on the user device 310 and transmitted to the server 320. In another example, a document may be created and stored on the user device 310 and the document, or modifications to the document, may be transmitted to the server 320.

In some implementations, a networked application, or an element thereof, may be accessed by multiple user devices. For example, the networked application 300 may be executed by a first user device 310 in communication with the server 32, and a document may be stored at the server 320. The networked application 300 may be executed by a second user device 340, which may be a computing device, such as the computing device 100 shown in FIG. 1 or the computing and communication devices 100A/100B shown in FIG. 2, a user may input modifications to the document at the second user device 340, and the modifications may be saved to the server 320.

In some implementations, a networked application, or an element thereof, may be collaboratively accessed by multiple user devices. For example, a first user device 310 may execute a first instance of the networked application 300 in communication with the server 320, and a document may be stored at the server 320. The first user device 310 may continue to display or edit the document. The second user device 340 may concurrently, or substantially concurrently, execute a second instance of the networked application 300, and may display or edit the document. User interactions with the document at one user device may be propagated to collaborating user devices. For example, one or both of the user devices 310/340 may transmit information indicating user interactions with the document to the server 320, and the server may transmit the information, or similar information, to the other user device 310/340. Although FIG. 3 shows two user devices, any number of user devices may collaborate. User interactions with the networked application 300 at one user device may be propagated to collaborating user devices in real-time, or near real-time. Some user interactions with the networked application 300 may not be transmitted to the server 320 and may not be propagated to the collaborating user devices.

Figure 4:
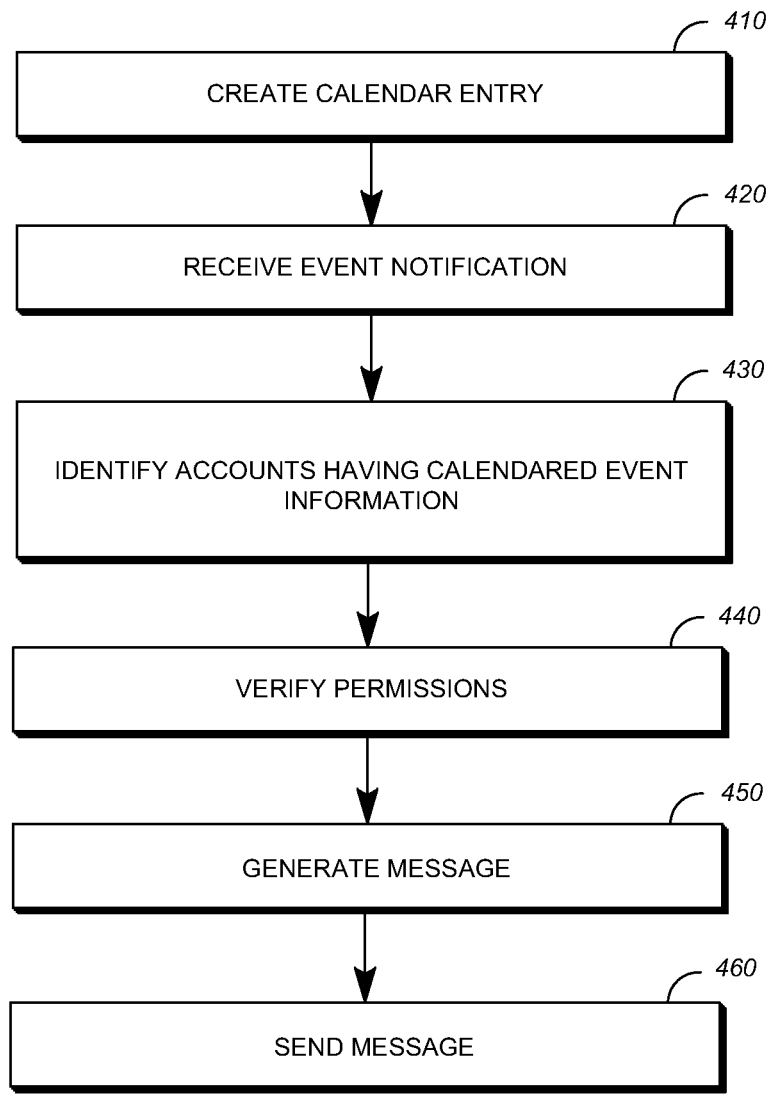
FIG. 4 is a block diagram of communication distribution based on calendar information in accordance with implementations of this disclosure.

FIG. 4 is a block diagram of communication distribution based on calendar information in accordance with implementations of this disclosure. Implementations of communication distribution based on calendar information can include creating a calendar entry at 410, receiving an event notification at 420, identifying an account having calendared event information at 430, verifying permissions at 440, generating an event information message at 450, sending the event information message at 460, or a combination thereof.

In some implementations, a calendar entry may be created at 410. For example, a user associated with an account may access a calendar associated with the account and may create a calendar entry. Creating the calendar entry may include, for example, generating a scheduling request indicating the event information at a local device, such as the user device 310 shown in FIG. 3, transmitting the scheduling request to a remote device, such as the server 320 shown in FIG. 3, receiving the scheduling request at the remote device, and storing the calendar entry indicating the event information at the remote device. The calendar entry, or scheduling request, may include event information such as an event identifier, a name of the event, a date of the event, a location of the event, or any other information that may be used to identify the event.

In some implementations, the event identifier, which may be a unique identifier, may be provided by a remote device. For example, a user may browse to a web site associated with the event, may click on a link or button to initiate creation of the calendar entry, and the web site may provide the event identifier. In an example, the user may be undecided whether to attend the event or purchase a ticket for the event, and may create the calendar entry as a reminder.

Creating a calendar entry at 410 is described with reference to creating a single calendar entry for a single user or account for simplicity; however, any number of calendar entries may be independently created by any number of users or accounts.

In some implementations, an event notification may be received at 420. For example, the event notification may be received at a networked device, such as the server 320 shown in FIG. 3. Receiving the event notification may include receiving event information from a person or organization associated with the event, such as a publisher or event promoter. The event information may include promotional material associated with the event, an event identifier, an offer associated with the event, a name of the event, a date of the event, a location of the event, or any other information that may be used to identify the event.

The event notification may include a request to transmit some or all of the event information to one or more users or accounts based on calendar information. In some implementations, the event notification may include a list of target users or accounts to send the event information. For example, the list of target users may include users that requested further information regarding the event. In some implementations, the event notification may include a skip list of users or accounts to exclude from sending the event information. For example, the skip list may include users that purchased a ticket to the event.

In some implementations, a user or an account having calendared event information may be identified at 430. For example, the user or account may be identified by a networked device, such as the server 320 shown in FIG. 3. Identifying an account having calendared event information may include searching stored calendar entries based on the event information received in the event notification at 420. For example, stored calendar entries may be searched based on the event identifier, the event name, the event date, the event location, or on any other information or combination of information that may be used to identify a calendar entry corresponding to the event. For example, the event may be a concert scheduled for a specified date, and a calendar entry scheduled for the specified date and including the term 'concert' may be identified.

In another example, creating a calendar entry at 410 may include a user browsing to a web site associated with the event and clicking on a link or button to initiate creation of the calendar entry. The web site may provide a unique identifier associated with the event, which may be stored with the calendar entry. The event notification received at 420 may include the unique identifier, and calendar entries including the unique identifier may be identified at 430.

Identifying a user or account at 430 is described with reference to identifying a single user or account for simplicity; however, any number of users or accounts may be identified based on any number of calendar entries.

In some implementations, permissions may be verified at 440. A remote device, such as the server 320 shown in FIG. 3, may verify permissions based on the identified user or account at 440. For example, verifying permissions may include determining whether the identified user or account is associated with an indication that event information messages are allowed or disallowed. In some implementations, the permission indication may be associated with criteria, such as specified event information. For example, the permission indication may indicate that event information messages are allowed for a specified event, or that event notification messages are allowed for all events.

In some implementations, verifying permissions may include determining that the user or account is associated with an indication that event information messages are not allowed and generating the event information messages at 450 and sending the event information messages at 460 may be omitted.

Although verifying permissions at 440 is shown between identifying a user account at 430 and generating an event information message at 450, other implementations of verifying permissions may be performed. In some implementations, creating a calendar event at 410 may include verifying permission. For example, a user may browse to a web site associated with the event and may click on a link or button to initiate creation of the calendar entry. The web site may provide a unique identifier associated with the event. Permissions may be verified to determine whether the unique identifier may be stored with the calendar entry. In some implementations, identifying a user account at 430 may include verifying permissions. For example, identifying a user account at 430 may include determining whether a user is associated with a permission indicating whether the user may be identified based on calendar information.

In some implementations, an event information message may be generated at 450. For example, the event information message may be generated by a networked device, such as the server 320 shown in FIG. 3. In some implementations, generating the event information message at 450 may include generating an e-mail message, which may include some or all of the event information included in the event notification. In some implementations, generating the event information message at 450 may include generating content for display on a local device, the content including some or all of the event information included in the event notification. In some implementations, the event information message may include a user or account identifier that may identify the user or account.

In some implementations, the event information message may be sent at 460. For example, sending the event information message may include transmitting an e-mail message including some or all of the event information to the user or account. In another example, sending the event information message may include sending content including some or all of the event information for display on a local device associated with the user, such as in a browser window.

In some implementations, although not shown in FIG. 4, the user or account may receive the event information message and may respond to the event information message. For example, the event information message may include a user identifier and a link to purchase tickets for the event. The user may click on the link and may purchase tickets, or otherwise confirm planned attendance, for the event. Information indicating that the user clicked on the link, that the user purchased tickets, or both, may be sent to a remote device, such as the server 320 shown in FIG. 3. In some implementations, information indicating the number of users that were sent the event information message, that received the event information message, that viewed the event information message, that responded to the event information message, or any combination thereof may be stored by a remote device, such as the server 320 shown in FIG. 3, may be transmitted to the person or organization that sent the event notification at 420, or both.

Other implementations of the diagram of communication distribution based on calendar information as shown in FIG. 4 are available. In implementations, additional elements of communication distribution based on calendar information can be added, certain elements can be combined, and/or certain elements can be removed. For example, in some implementations, responding to the event information message can be skipped and/or omitted.

Communication distribution based on calendar information, or any portion thereof, can be implemented in a device, such as the computing device 100 shown in FIG. 1. For example, a processor, such as the processor 140 shown in FIG. 1, can implement communication distribution based on calendar information, or any portion thereof, using instruction, such as the instructions 160 shown in FIG. 1, stored on a tangible, non-transitory, computer readable media, such as the memory 150 shown in FIG. 1.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIGS. 1-3.

Further, for simplicity of explanation, although the figures and descriptions herein may include sequences or series of steps or stages, elements of the methods disclosed herein can occur in various orders or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices (and the algorithms, methods, or any part or parts thereof, stored thereon or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the computing and communication devices do not necessarily have to be implemented in the same manner.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for communication distribution based on calendar information, the method comprising:

receiving, from a user device at a remote device, a first permission indicating whether event information messages from an event promoter device related to an event are allowed to be sent to or are blocked from an account associated with a calendar;

receiving, from the user device at the remote device, a second permission indicating whether the account is to be identified based on calendar entries and event information;

receiving, from the user device at the remote device, a scheduling request for the account associated with the calendar, the scheduling request including event information corresponding to the event, the event associated with the event promoter device, and the event information including an event identifier;

storing, at the remote device, a calendar entry in the calendar, the calendar entry including at least some of the event information;

in response to the first permission indicating that event information messages are allowed:
adding the account to identifiable account information; and
storing the event identifier in the calendar entry;

receiving, from the event promoter device at a networked device, an event notification indicating the event and comprising a request to transmit an event information message to the account associated with the event,
the networked device being coupled to the remote device to identify user accounts in response to the networked device receiving the event notification, and
the remote device being inaccessible to the event promoter device to identify the user accounts;

identifying, by the networked device in the identifiable account information stored at the remote device and based on the event information, target user accounts to send event information messages to, wherein the target user accounts includes the account, wherein the account is identified by the network device responsive to determining that the second permission indicates that the account is to be identified;

in response to the identifying, verifying, by the remote device, that the first permission indicates that event information messages are allowed to be sent to the account for the event; and in response to the verifying by the remote device:
generating, by the networked device, the event information message based on the event notification; and
sending, by the networked device, the event information message to the account.

2. The method of claim 1, wherein the event notification includes the event identifier and the event information includes the event identifier.

3. The method of claim 1, wherein receiving the scheduling request includes receiving a plurality of scheduling requests, wherein each scheduling request in the plurality of scheduling requests is associated with a respective account in a plurality of accounts and a respective calendar in a plurality of calendars, and wherein storing the calendar entry includes storing a respective calendar entry for each scheduling request in the plurality of scheduling requests in a respective calendar in the plurality of calendars.

4. The method of claim 3, wherein identifying the account includes identifying each account in the plurality of accounts and wherein sending the event information message to the account includes sending the event information message to each account in the plurality of accounts.

5. The method of claim 4, wherein receiving the event notification includes receiving a list of account identifiers and wherein sending the event information message to each account in the plurality of accounts excludes sending the event information message to the accounts from the plurality of accounts that are associated with an account identifier from the list of account identifiers.

6. The method of claim 1, wherein the event promoter device is associated with a person or organization associated with the event.

7. The method of claim 1, wherein the event notification further includes at least one of an offer associated with the event and promotional material associated with the event.

8. The method of claim 1, further comprising:
responsive to the first permission indicating that event information messages are blocked from the account, omitting sending the event information message from the remote device to the account.

9. The method of claim 1, further comprising:
responsive to the second permission indicating that the account cannot be identified, omitting sending the event information message from the remote device to the account.

10. A method comprising:
receiving, from a user device at a remote device, a first permission indicating whether to allow or block an event notification related to an event from an event promoter device for an account associated with the user device, wherein the event is associated with the event promoter device and the event promoter device is not associated with the remote device;
receiving, from the user device at the remote device, a second permission indicating whether the account is to be identified based on a calendar entry and event information;
receiving, from the user device at the remote device, a third permission indicating whether an event identifier is to be stored in the calendar entry;
receiving, from the user device at the remote device, a scheduling request for the account associated with the calendar, the scheduling request including the event information;
storing, at the remote device, the calendar entry in the calendar;
responsive to the third permission indicating that the event identifier can be stored, storing the event identifier with the calendar entry;
responsive to the first permission indicating that event notifications are allowed, adding the account to identifiable account information;
receiving, from the event promoter device at a networked device, an event notification indicating the event, wherein
the event notification includes the event information including at least one of the event identifier, a name of the event, a date of the event, or a location of the event, and
the remote device is inaccessible by the event promoter device to identify accounts associated with a calendar based on the event information;
identifying, by the networked device in the identifiable account information stored at the remote device based on the event information, the account associated with the calendar based on the event information being present in the event notification and the event information being stored in the calendar entry in the calendar, wherein the event information stored in the calendar entry includes the event identifier, wherein the account is identified by the network device based on the second permission indicating that the account can be identified and the third permission indicating that the event identifier is stored in the calendar entry; and
in response to the identifying, verifying that the first permission indicates that messages are allowed for the event and sending a message indicating the event from the remote device to the account.

11. The method of claim 10, wherein the event notification includes the event identifier and the event information includes the event identifier.

12. The method of claim 10, wherein receiving the scheduling request includes receiving a plurality of scheduling requests, wherein each scheduling request in the plurality of scheduling requests is associated with a respective account in a plurality of accounts and a respective calendar in a plurality of calendars, and wherein storing the calendar entry includes storing a respective calendar entry for each scheduling request in the plurality of scheduling requests in a respective calendar in the plurality of calendars.

13. The method of claim 12, wherein identifying the account includes identifying each account in the plurality of accounts and wherein sending the message to the account includes sending the message to each account in the plurality of accounts.

14. The method of claim 13, wherein receiving the event notification includes receiving a list of account identifiers and wherein sending the message to each account in the plurality of accounts excludes sending the message to the accounts from the plurality of accounts that are associated with an account identifier from the list of account identifiers.

15. The method of claim 10, wherein the event notification further includes at least one of an offer associated with the event and promotional material associated with the event.

16. A non-transitory computer-readable medium storing instructions that, when executed by a processor, are configured to cause a computing device to:
receive, from a user device at a remote device, a first permission indicating whether event information messages from an event promoter device related to an event are allowed to be sent to or are blocked from an account associated with a calendar;
receive, from the user device at the remote device, a second permission indicating whether the account is to be identified based on calendar entries and event information;
receive, from the user device at the remote device, a scheduling request for the account associated with the calendar, the scheduling request including event information corresponding to the event, the event associated with the event promoter device, and the event information including at least one of an event identifier, a name of the event, a date of the event, and a location of the event;
store, at the remote device, a calendar entry in the calendar, the calendar entry including at least some of the event information;
in response to the first permission indicating that event information messages are allowed:
add the account to identifiable account information; and
store the event identifier in the calendar entry;
receive, from the event promoter device at a networked device, an event notification indicating the event and comprising a request to transmit an event information message to the account associated with the event, the networked device being coupled to the remote device to identify user accounts in response to the networked device receiving the event notification, and the remote device being inaccessible to the event promoter device to identify the user accounts;

identify, by the networked device in the identifiable account information stored at the remote device and based on the event information, target user accounts to send event information messages to, wherein the target user accounts includes the account, wherein the account is identified by the network device responsive to determining that the second permission indicates that the account is to be identified;

in response to the identifying, verify, by the remote device, that the first permission indicates that event information messages are allowed to be sent to the account for the event; and in response to the verifying by the remote device:
generate, by the networked device, the event information message based on the event notification; and
send, by the networked device, the event information message to the account.

17. The non-transitory computer-readable medium of claim 16,
wherein the event notification includes the event identifier and the event information includes the event identifier.

18. The non-transitory computer-readable medium of claim 16, wherein receiving the scheduling request includes receiving a plurality of scheduling requests, wherein each scheduling request in the plurality of scheduling requests is associated with a respective account in a plurality of accounts and a respective calendar in a plurality of calendars, and wherein storing the calendar entry includes storing a respective calendar entry for each scheduling request in the plurality of scheduling requests in a respective calendar in the plurality of calendars.

19. The non-transitory computer-readable medium of claim 16, wherein the event promoter device is associated with a person or organization associated with the event.

20. The non-transitory computer-readable medium of claim 16, wherein the event notification further includes at least one of an offer associated with the event and promotional material associated with the event.

* * * * *